United States Patent [19]
Hoss et al.

[11] Patent Number: 5,951,638
[45] Date of Patent: Sep. 14, 1999

[54] INTEGRATED MULTIMEDIA MESSAGING SYSTEM

[75] Inventors: Robert J. Hoss, Brewster, N.Y.; Frank S. Woo; Andrew Rouse, both of Andover, Mass.; Imran H. Qidwai, Westborough, Mass.

[73] Assignee: International Business Machines Corporation, Armonk, N.Y.

[21] Appl. No.: 08/821,535

[22] Filed: Mar. 21, 1997

[51] Int. Cl.$^6$ ..................................................... G06F 13/00
[52] U.S. Cl. ............................................................. 709/206
[58] Field of Search ................................ 364/DIG. 1 MS, 364/DIG. 2 MS; 380/49, 48, 50; 379/88.18, 88.22, 93.24, 201; 395/200.3, 200.43, 200.44, 200.45, 200.48; 709/206, 200, 213, 214, 215, 218, 232

[56] References Cited

U.S. PATENT DOCUMENTS 5,647,002   7/1997   Brunson ...................................... 380/49

*Primary Examiner*—Robert B. Harrell
*Attorney, Agent, or Firm*—Kudirka & Jobse, LLP

[57] ABSTRACT

An integrated messaging system uses existing messaging equipment to receive, store, retrieve and manage messages in media types and formats appropriate to each existing system using protocols which are specific to that system. Two or more systems are tightly coupled in that a message received in one system can be accessed from all systems. Coordination between messaging systems is achieved by a synchronizer system which periodically connects to each system by means of a standard interface and insures that messages created or received in one system are distributed or identified in all other messaging systems. Thus, the messaging systems can operate together even though they have different user interfaces, storage designs and formats and access and routing protocols. In one embodiment, a message received in one system is copied to the other system. In another embodiment, the header information in a message is preserved in a message created in the other system, but the message is not copied. The header information allows the message to be located and reproduced. In still another embodiment, one messaging system is designated as the single store for all messages.

20 Claims, 8 Drawing Sheets

INTEGRATED MULTIMEDIA MESSAGING SYSTEM

FIELD OF THE INVENTION

This invention relates to multimedia messaging systems, in general, and, more specifically, to coordination and interconnection of messaging systems which process information in different formats, protocols or media types.

BACKGROUND OF THE INVENTION

Most professionals have several communication channels by which others can contact them when they are not physically present to receive the contact. These channels have traditionally included voice mail, facsimile transmission, and text-based electronic mail or e-mail. In addition, paging systems are commonly used as they provide convenient messaging to mobile workers. With the advent of video technology, video messages are becoming more popular as a channel of communication as well. These communications channels give associates, customers, or other message senders relatively easy access to the message receiver. They allow teams to work together while enabling closer contact with customers. Communications and messaging are the core mechanisms used by most organizations, ensuring that a wide range of business functions proceed smoothly and swiftly.

For example, voice mail has expanded to allow large groups of employees, customers, and suppliers to send, receive, store and manage telephone-based messages. The continued popularity of voice messaging as a communications channel is clear. There are more than 50 million voice mailboxes worldwide, and the voice-messaging market is growing at about 25 percent a year. The capabilities of e-mail have also been expanded with the advent of sound-capable computers, which support the use of recorded voice clips in e-mail. E-mail is also phenomenally popular, with more than 35 million electronic mailboxes in place today—a number expected to grow to more than 65 million users by 1997.

However, the heterogeneous formats and protocols of various message types used in different communication channels as well as the different systems required for receiving/managing the various messages can also lead to serious challenges for message recipients—challenges that can lower productivity and make communication a headache rather than a help.

Clearly, there is a need for an effective method of managing heterogeneous types of messages and message formats that may be received by a user. For instance, during a normal business day, a person can receive dozens of calls, faxes, voice-mail messages, and e-mail messages. Sometimes, that person may receive video and paged messages as well. The challenge of managing this steady—sometimes torrential—flow of information can be taxing for even the most patient person. Information in different forms arrives in different locations via different machines. Text-based e-mail may be received in a user's e-mail mailbox, received voice messages may be stored in a separate voice mailbox, video and paged messages stored in a video and pager mailbox, respectively, while faxed messages may be stored in paper form in a physical in-box for the recipient to pick up. The recipient must gather this incoming information from all of these various locations, review and prioritize it, then respond in the right format and in a timely manner.

This can be quite difficult when the recipient is physically remote from one or more of the mailboxes. For instance, when a business person is traveling away from the office and is unreachable via facsimile, incoming faxes can pile up back at the office and remain unanswered until that person returns to the office and has the time to examine the faxes and respond. Furthermore, if the business person is staying at a hotel where there is no analog telephone line or jack for connecting a modem, e-mail messages cannot be retrieved or answered. A similar problem occurs when the business person is in a country that has a telephone system sufficiently different from the United States telephone system so that it is incompatible with the modem or communications software used by the person.

The driving need for improved communication channels has not gone unnoticed by telecommunications firms and software companies which currently offer solutions to the messaging quandary in which many professionals presently find themselves. Many conventional solutions operate—with varying degrees of success—to combine two main communications channels, for example, voice-mail and e-mail.

One solution presently used for managing the various voice mail and e-mail message formats is typically called "unified messaging". Unified messaging systems differ in how tightly, or loosely, they join e-mail and voice-mail capabilities. For example, one unified messaging approach uses a single graphical user interface display to access both a voice mailbox and a separate e-mail mailbox. While such a system does allow the user to operate both the voice mail system and the e-mail system from a single location, this loosely coupled solution does not support access when the user is away from the location. Another problem with this type of system is that it does not provide a coordinated method of presenting, creating, managing, and filing messages, so it does little to combat the clutter of incoming information.

Another unified messaging technique consolidates both voice-mail and e-mail into one mailbox, an approach that generally requires an extensive investment in new equipment. For example, such a system might require adding voice messaging capabilities to e-mail server hardware. In addition to the high cost of new equipment, this approach frequently requires network redesign, produces a significant increase in administrative burden, and mandates user retraining. Basically, this amount of change results in a loss of existing investments in messaging equipment.

Consequently, there is a need for an effective method of storing, retrieving and managing messages which are in different formats and different media types as well as providing a means for accessing those messages, regardless of their form and the protocol used to manage and store them, from any media that users have available to them.

SUMMARY OF THE INVENTION

An integrated messaging system uses existing messaging systems to receive, store, retrieve and manage messages in media types and formats appropriate to each existing system using protocols which are specific to that system. Two or more systems are tightly coupled in that a message received in one system can be accessed from all other systems. Coordination between messaging systems is achieved by a synchronizer system which periodically connects to each system by means of a standard interface and insures that messages created or received in one system are distributed or identified in all other messaging systems. Thus, the messaging systems can operate together even though they have different user interfaces, storage designs and formats and access and routing protocols.

In one embodiment, a message received in one system is copied to the other system. For example, assuming a voice-mail system is coupled to an e-mail system, if a voice message is received in the voice-mail system, the inventive integrated messaging system will create an e-mail message in the e-mail system with a digitized audio file attachment containing the voice message. Conversely, if an e-mail message is received in the e-mail system, the inventive integrated messaging system will create a voice-mail message in the voice-mail system with a text component containing the text body of the e-mail message.

In another embodiment, if a message is received in one system, identifying information (for example, Originator, Date/time received, and Subject) is preserved in a message created in the other system. For example, in an e-mail/voice-mail system, an e-mail message created in the e-mail system for a received voice-mail message in the voice-mail system will contain a digitized audio file attachment containing information allowing the inventive integrated messaging system to find the message in the voice-mail system and play it. In this embodiment, other information contained in the original message received in one messaging system, for example, the voice or text data, is not copied to the other messaging system.

In accordance with yet another embodiment, one messaging system is designated as the single store for all messages regardless of the format in which the messages are received. For example, if the aforementioned e-mail system is configured to be the single store for a user's messages, when a voice message is received in the voice-mail system, the inventive integrated messaging system will create an e-mail message in the e-mail system with a digitized audio file attachment containing the voice message. The inventive system will then delete the original voice message in the voice-mail system.

DETAILED DESCRIPTION OF THE PREFERRED EMBODIMENTS

Figure 1:
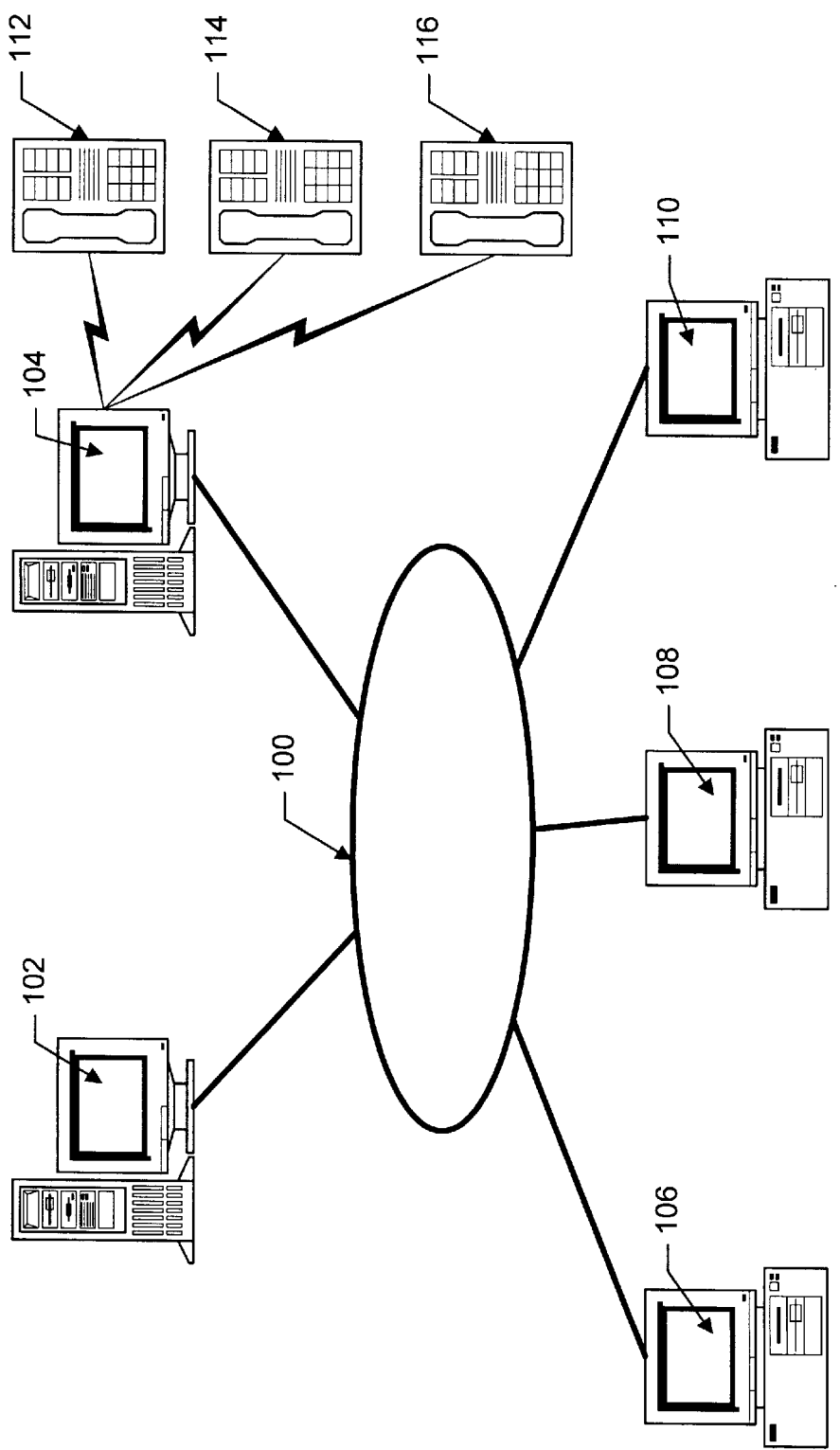
FIG. 1 is a schematic block diagram of an integrated messaging system constructed in accordance with the principles of the present invention.

FIG. 1 illustrates, in very general form, one embodiment of the invention utilizing two servers connected to a network. Multimedia messaging systems are resident on each server. These messaging systems could include one or more e-mail systems, one or more voice-mail systems, facsimile management systems, pager systems or the like. The messaging system are "heterogeneous" in that each system stores messages in a format and according to a protocol which is appropriate to the messages which it receives and manages. Even two messaging systems which receive and store messages with the same media types and formats may store messages in different formats and may handle the messages according to different protocols because the systems were manufactured by different vendors. For the purposes of illustration, it will be assumed in the following discussion that server 102 is an e-mail server and that server 104 is a voice-mail server. Other types of servers could be used without departing from the spirit and scope of the invention.

An e-mail system resident on an e-mail server 102 which receives e-mail messages in in various media types, for example text, digitizes the text messages and stores the digitized text messages in a storage associated with the server. The second system is a voice-mail system resident on a voice-mail server 104. This server receives voice-mail messages in an audio form, digitizes the audio message and stores the digitized audio in a storage associated with the server.

The system is shown as network-based and comprises a number of computer terminals, such as terminals 106, 108 and 110 connected to servers 102 and 104 by means of a local area network 100. As illustrated in FIG. 1, network 100 is an Ethernet network, however, other types of networks can also be used, such as token ring, FDDI or other well-known networks. The network could be local (geographically restricted) but could also be a metropolitan area network (MAN) or wide area network (WAN) without departing from the spirit and principles of the invention.

E-mail server 102 can connect with any of computers 106, 108 and 110 via network 100 so that the e-mail system resident thereon can receive and store text-based e-mail messages. The digitized text messages can then be presented or displayed on display screens in computers 106, 108 and 110. In a similar manner, a voice-mail system resident on server 104 can connect with a plurality of telephones, of which telephones 112–116 are shown, by means of communication links 118–122. Communication links 118–122 may illustratively be land-based links, radio links or satellite links, all of which are available with conventional technology. The voice-mail system on server 104 can receive analog audio signals from telephones 118–122, digitize the signals and store digitized voice-mail messages on an associated database (not shown.) Although FIG. 1 illustrates only a text-based e-mail server and a voice-mail server, as mentioned above, other servers can be used for other types of messages. For example, a fax/image gateway server may be used to store and forward facsimile messages, a pager server can be used to store and receive page messages and a video server may also be used to receive and store video messages. These additional servers, although not shown, can be linked and synchronized in the same manner as will be discussed for the e-mail server 102 and the voice-mail server 104.

For the purposes of illustration the e-mail messaging system running on e-mail server 102 may be a NOTES® server which runs a NOTES® integrated database and e-mail messaging system developed and distributed by the Lotus Development Corporation located at 55 Cambridge Parkway, Cambridge, Mass. 02142. Similarly, for the purposes of illustration, the voice-mail system running on voice-mail server 104 may be an INTUITY AUDIX® Multimedia Messaging System (MACH 4) system developed and distributed by Lucent Technologies, Inc., located at Basking Ridge, N.J.

The inventive integrated messaging system enables users to access voice-mail received in the voice-mail system from the e-mail system and to access e-mail received in the e-mail system from the voice-mail system. The integrated messaging system "links" a message received in one message store to the other message store. There are three variations of linked messages. In one embodiment, a message received in one system is copied to the other system. For example, if a voice message is received in the voice-mail system, the inventive integrated messaging system will create an e-mail message in the e-mail system with a digitized audio file attachment containing the voice message. Conversely, if an e-mail message is received in the e-mail system, the inventive integrated messaging system will create a voice-mail message in the voice-mail system with a text component containing the text body of the e-mail message.

In another embodiment, if a message is received in one system, the header or identifying information (Originator, Date/time received, and Subject) is preserved in a message created in the other system. Also, an e-mail message created in the e-mail system for a received voice-mail message in the voice-mail system will contain a digitized audio file attachment containing information allowing the inventive integrated messaging system to find the message in the voice-mail system and play it. In this embodiment, other information contained in the original message received in one mail system, for example, the voice or text data, is not copied to the other mail system.

In accordance with yet another embodiment, one mail system is designated as the single store for all voice messages and e-mail messages. For example, if the e-mail system is configured to be the single store for a user's messages, when a voice message is received in the voice-mail system, the inventive integrated messaging system will create an e-mail message in the e-mail system with a digitized audio file attachment containing the voice message. The inventive system will then delete the original voice message in the voice-mail system.

The integrated messaging system includes an audio player application program which runs in a user's computer and allows the user to play digitized audio file attachments in e-mail documents on the user's multimedia PC or on the telephone. The audio player, optionally in conjunction with a request agent program, can also access the voice-mail system to retrieve and play files stored thereon in the case where copies of the files are not available on the e-mail system. The audio player application displays controls, such as pause, rewind, and seek on the PC monitor which can all be used to control playback. The same controls can also be used when messages are played over the telephone.

The request agent program runs either on the e-mail server or on a standalone machine and allows the audio player program to access the voice-mail server in order to play voice messages on the telephone or to retrieve voice messages from the voice-mail system to play on a user's multimedia computer in the case where the user's computer cannot access the voice-mail system with the correct protocol. In one illustrative embodiment, the request agent program uses an IPX/SPX protocol to communicate with the audio player on the user's desktop and uses a TCP/IP protocol to communicate with the voice-mail server.

Figure 2:
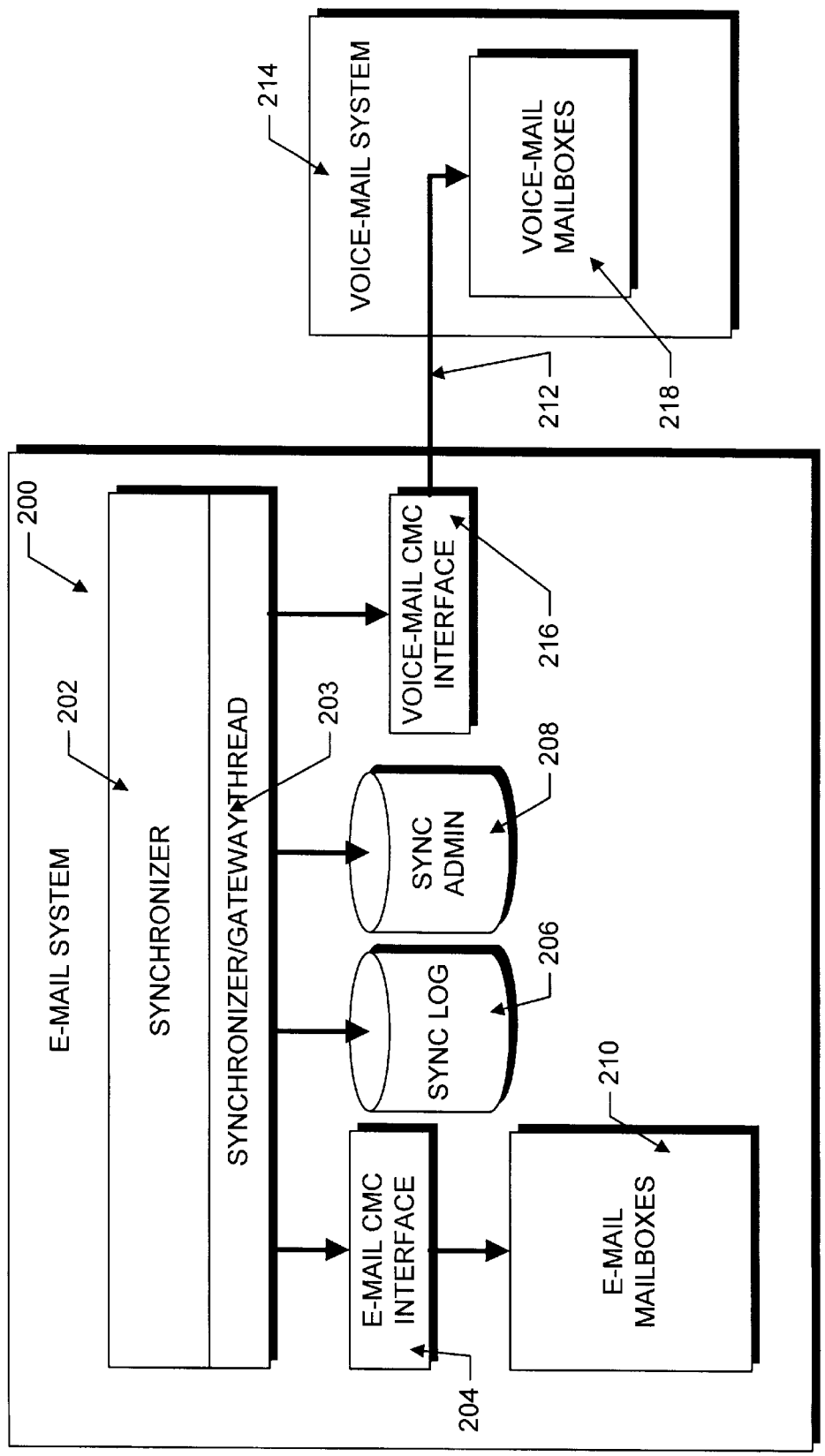
FIG. 2 is a more detailed block schematic diagram of a first messaging system server incorporating a synchronizer system for synchronizing the operation of two messaging systems.

FIG. 2 is a high-level block diagram illustrating the configuration of an e-mail server 200 which incorporates a synchronizer program 202 in accordance with the principles of the present invention. The synchronizer program 202 could also run on an independent computer without changing the operation of the inventive messaging system. The synchronizer program 202 implements the linking of e-mail messages and voice-mail messages and is a server process that is initiated by a system administrator and is always running on the server 200. It comprises several independent threads which perform the synchronizer operations as discussed in detail below.

In particular, the synchronizer application program contains a synchronization/gateway thread 203 that communicates with e-mail mailboxes 210 and the voice-mail server 214 by means of a modified Common Messaging Call (CMC) application programming interface (API). The CMC API is a standard interface which is described in detail in a X.400 API Association Specification which is hereby incorporated by reference. Certain protocol commands have been extended as described below to provide sufficient functionality to allow operation with a wide variety of messaging systems. More specifically, the synchronizer program 202 communicates with mailboxes 210 via e-mail CMC interface 204 and with the voice-mail mailboxes 218 in the voice-mail server 214 by means of the voice-mail CMC interface 216 (over a network link 212.)

The e-mail CMC interface 204 comprises conversion programs which receive the modified CMC protocol commands from the synchronizer/gateway thread 203 and generate commands in the e-mail system native interface and the voice-mail CMC interface 216 converts the CMC protocol commands to commands in the native interface of the voice-mail messaging system. Both the e-mail CMC interface 204 and the voice-mail CMC interface 216 implement a subset of the CMC commands, which subset includes the following commands:

| | |
|---|---|
| Act On | Performs an action on a specified message. The actions include deletion of a message, saving of a message and marking the message as read. |
| List | Generates lists with summary information about messages which meet specified criteria. |
| Read | Reads a message from a specified user's mailbox. |
| Free | Frees memory allocated by the interface. |
| Logon | Logs on the interface |
| Logoff | Logs off the interface |

The CMC API allows for extensions to each of the commands and to the data associated with each of the commands. These extensions are used to perform functions not included in the published CMC API specifications. Most extensions are optional and may or may not be supported by particular messaging systems. The set of extensions actually used with a particular messaging system are determined when the synchronizer logs onto the messaging system. At that time, a query is sent by the synchronizer to the messaging system to determine the capabilities of the messaging system and the extensions used are based on those capabilities. In the illustrative embodiments, the extensions have been used to interface the CMC commands with the e-mail internal interface calls and with the voice-mail internal interface calls.

The following extensions are used for the main commands:
Act On
Delivery Failure Reason
Unique Message ID
Save Message
Intended Recipient
Mail Route Servers Delivery Report
Delivery Return Receipt
Integrated Messaging Truncated
Text Note as Format
Attach Text
Attach Fax
Attach Sound
Delete Reason
Extended Status
Mark As Read
Message Expiration Date
Attach Binary
Attach Primary
List
Integrated Messaging Filter
Extended Status
Unique Message ID
Delivery Report
Delivery Return Receipt
Message Expiration Duration
Reply Server
Read
Unique Message ID
Return Receipt
Delivery Report
Integrated Messaging Truncated
Headers Only
Text Note as Format
Attach Sound
Attach Binary
Attach Fax
Extended Status
Message Expiration Duration
Attach Text
Attach Primary
Delivery Return Receipt
Reply Server
Logon
Session Create
Session Associate
Logoff
Last Update The functions of the e-mail CMC interface 204 and the voice-mail CMC interface 216 are accessible through sessions. A session is created when a CMC Logon request is made, and terminated when a CMC Logoff request is made. The synchronizer 202 establishes sessions at regular intervals, or passes, as instructed by the configuration database, to enable it to access the interface functionality. Two different types of sessions are created, one containing the other. The first type, called a "trusted" server session, is created by the synchronizer 202 and provides password authorization for all succeeding sessions contained within it. Effectively, the trusted server session allows the synchronizer to access user mailboxes in an appropriate messaging system without a password. This simplifies administration and allows users to change their passwords without informing the synchronizer. During a trusted server session, the synchronizer logs on to both the e-mail and the voice-mail systems. This session is also used to obtain configuration information right after the synchronizer 202 is started. The second type, a user session, is also created by the synchronizer 202, and is associated with a trusted server session. It provides access to a particular user's e-mail and voice-mail mailboxes. During an e-mail server session, the synchronizer 202 creates user sessions, one at a time, to access messages in each user's respective e-mail mailbox and voice-mail mailbox. Once a user session is active, the synchronizer 202 may get message summary information on a particular mailbox database, or a filtered subset of it through a CMC List request. It may then use the CMC Read function to read particular messages from that mailbox. When the synchronizer 202 determines that a message must be saved, marked as read, or deleted, it makes a CMC Act On request during an active session. When all needed message processing has been completed for a particular e-mail and voice-mail user, the synchronizer 202 terminates the session by making a CMC Logoff request for that user. When message processing for all configured e-mail and voice-mail users has been completed, the synchronizer 202 terminates the server session by making a CMC Logoff request.

Figure 3:
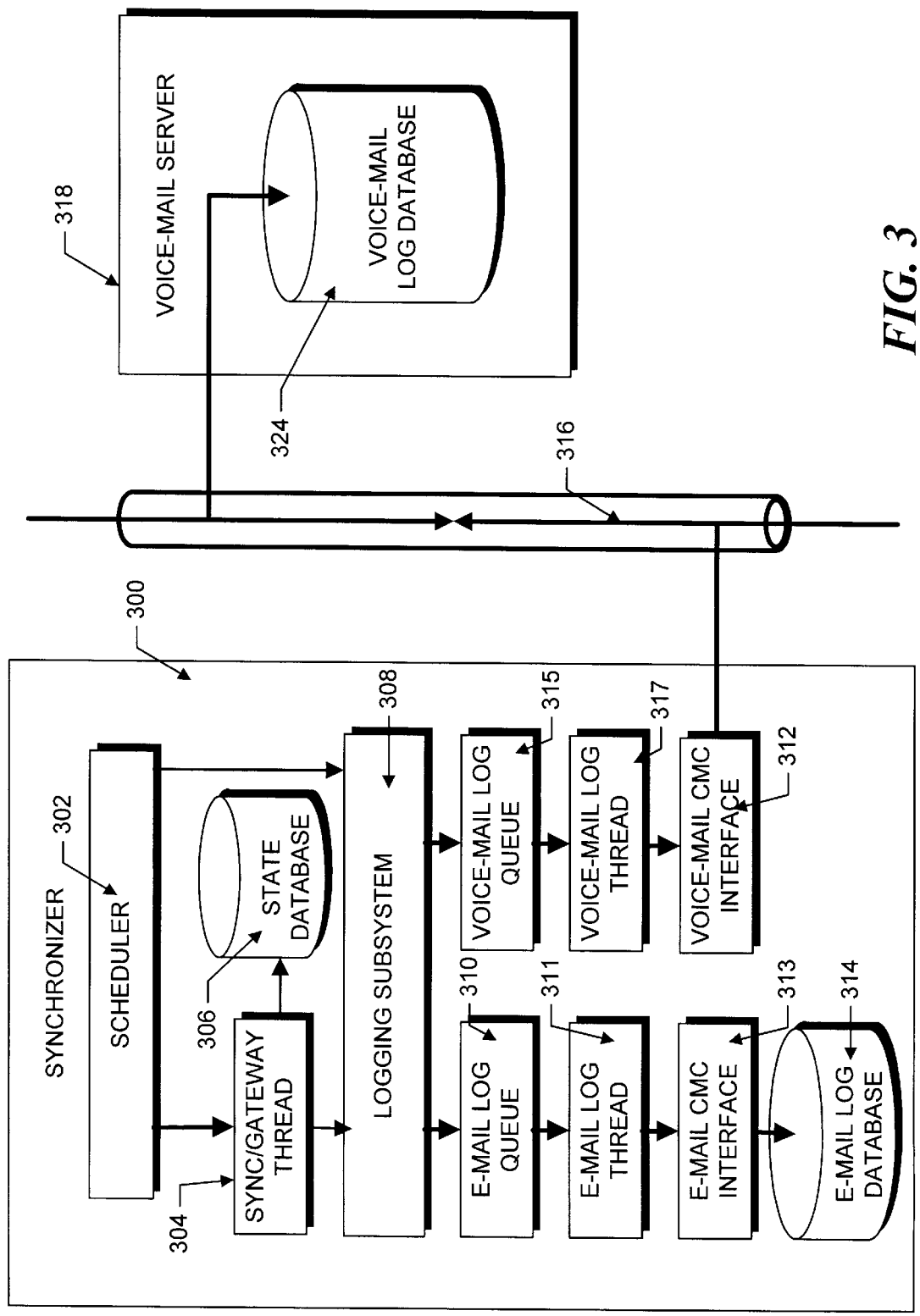
FIG. 3 is a more detailed block schematic diagram of the synchronizer of the present invention illustrating the architecture of the logging subsystem.

FIG. 3 illustrates, in more detail, the structure of the synchronizer program 202. The synchronizer program 202 links a user's voice-mail messages in the voice-mail system with e-mail messages in the e-mail system. The synchronizer program 300 comprises a scheduler 302 which maintains a state database 306 (via an update thread, not shown) so that when a message changes state (deleted or marked read) in one message system, the linked message in the other message system can be found and a similar state change applied.

The state database 306 is the repository of all state information about the messages that are synchronized between a user's two mailboxes. The state database 306 is persistent and is saved on disk. The scheduler 302 creates a state database update thread (not shown) and schedules the update thread when the synch/gateway thread 304 indicates a user's message state has changed.

Synchronizer program 300 also provides, via a sync/gateway thread 304, gateway functionality between the voice-mail system and the e-mail system, thereby allowing messages to be transferred from the voice-mail system to the e-mail system and from the e-mail system to the voice-mail system as previously described. For example, if an e-mail message is synchronized to a voice-mail message, the user can listen to the e-mail message using the voice-mail system and record a voice reply. The reply message will be sent via the synch/gateway thread 304 directly to the originator's e-mail mailbox.

The synchronizer program 300 is composed of several components, including a scheduler 302 which initializes and starts up the other components. The scheduler 302 reads configuration data and sets up internal data structures containing the configuration. Before each synchronization cycle is started the scheduler 302 checks whether any configuration data has changed and includes any changes in the active configuration.

Scheduler 302 also assigns user mailbox pairs that need to be synchronized to synch/gateway thread 304, which will perform the synchronization. Likewise, the scheduler 302 assigns configured gateways to the sync/gateway thread 304, which will route messages between the voice-mail and e-mail systems. Finally, scheduler 302 gracefully shuts down other software components and stores existing data structures when it is aborted by the administrator.

The synch/gateway thread 304 manages the link between a user's voice-mail mailbox and e-mail mailbox. It uses the state database 306 to save the state of each user's message in each system and updates the message in one system when its state changes in the other system. In addition, the sync/gateway thread 304 delivers e-mail messages addressed to voice-mail users and voice-mail messages addressed to e-mail users.

A logging subsystem 308 enables the synchronizer 300 to log events and errors to a system console (not shown), an e-mail log database 314, via an e-mail log queue 310 or a voice-mail log database 324 via a voice-mail log queue 315. The synchronizer 300 decides what to log and the logging subsystem 308 formats and delivers the message to the requested output device. Logging subsystem 308 creates a queue (310 and 315) and a separate thread (311 and 317) for each messaging system. The thread empties its assigned queue and passes the logged message to the messaging system. Since the logging system in the illustrative embodiment is operating in the e-mail server, the e-mail log queue 310 and the e-mail log database 314 are located in the e-mail server and can be accessed directly.

The voice-mail log thread 317 communicates with the voice-mail server 318 by means of a CMC interface 312. The CMC interface 312 converts logging commands into the voice-mail system native interface. The native interface commands are sent over a network, schematically illustrated as network 316, to the voice-mail server 318. The voice-mail log database 324 is located in the voice-mail server 318.

Figure 4:
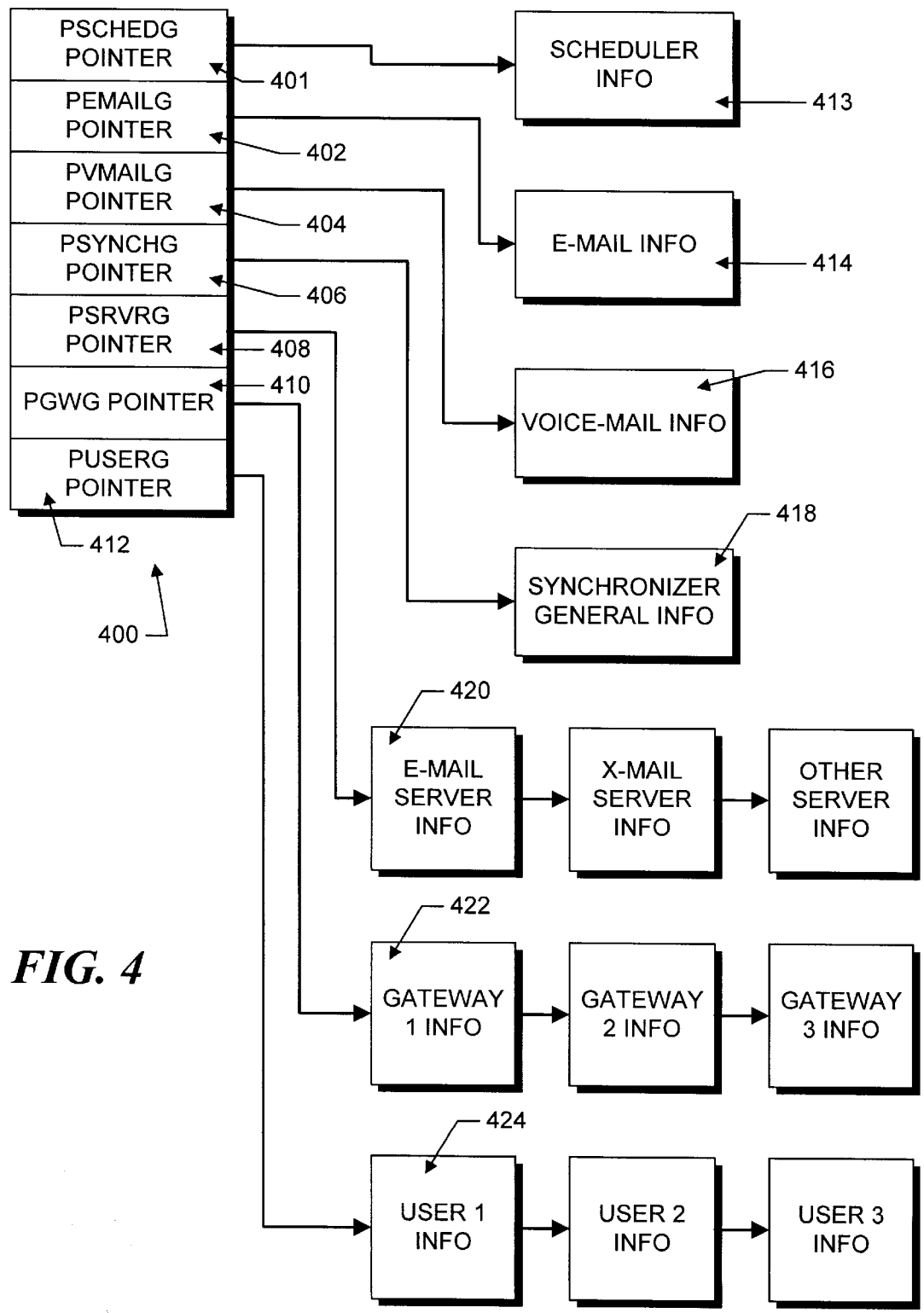
FIG. 4 is block diagram indicating the main data structure used by the synchronizer illustrated in FIG. 3.

There are a number of global data structures that are shared by the various subsystems of the synchronizer program 300. The scheduler 302 creates these data structures during startup of the synchronizer program 300 and the data structures are illustrated in more detail in FIG. 4 where a main data structure comprises a pointer table 400 which contains a number of pointers, 402–412, to various other structures 414–424. These pointers include a pointer pSchedG 401 to a structure 413 containing information used by the scheduler. Another pointer pEmailG 402 points to a structure 414 containing information about the e-mail system. In particular, structure 414 contains function pointers to the e-mail CMC function call entry points.

A pointer pVmailG 404 is also included to a structure 416 containing information about the voice-mail system. In particular, structure 416 contains the function pointers to the voice-mail CMC function call entry points.

Another included pointer is pointer pSyncG 406 to a structure 418 containing information needed by the scheduler 302, such as the current synchronization state. A pointer pSvrG 408 identifies a linked list 420 of structures containing information about configured mail system servers that synchronizer 300 accesses. In the illustrative embodiment, there are at least two mail system nodes in the list—an e-mail server information node and a voice-mail server information node. In systems which include other servers, an information structure for each other server would be linked to the list. Configuration information such as server name, as well as run-time information, such as current session ID, are contained in the linked data structures 420 for each server.

Another pointer pGwG 410 identifies a linked list 422 of structures containing information about gateways configured for synchronizer 300. A further pointer pUserG 412 points to a linked list 424 of structures containing information about users configured for synchronizer 300.

Synchronizer 300 is designed to create multiple synch/gateway threads of which thread 304 is illustrated. Scheduler 302 controls the processing of messages in user and gateway mailboxes by scheduling the synch/gateway thread 304. At each synchronization cycle, scheduler 302 sends a command to synch/gateway thread 304 to process cross-domain messages for a gateway configured for synchronizer 300 and identified in linked list 422. To process this command, thread 304 assumes a gateway thread context for a configured gateway and delivers cross-domain messages that have been previously queued for delivery either into a e-mail foreign domain mailbox or into a cross-domain queue for this gateway. After processing of the gateway is complete, scheduler 302 will assign another configured gateway from list 422 to be processed by the sync/gateway thread 304 until all configured gateways have been processed.

After all gateways have been processed, scheduler 302 sends a command to the synch/gateway thread 304 to process messages for a user configured for synchronizer 300 and selected from list 424. Thread 304 now assumes a synchronizer thread context for this user and synchronizes any messages that need synchronization, i.e., either new messages or old messages that have changed state. When a user's mailboxes have been synchronized, the synch/gateway thread 304 signals scheduler 302 that it is done and scheduler 302 assigns another user to the synch/gateway thread 304 until all users configured for synchronizer 300 and appearing on list 424 have been processed. The scheduler 302 supports several notification methods from each messaging system. When the synchronizer 300 starts, the scheduler 302 queries each messaging system to find which event notification type is compatible with that system. The notification types are No Event: No event notification is supported by the messaging system. In this case, scheduler 302 schedules a session for each user during each trusted server session.

Poll Event: The messaging system serves specific events which the synchronizer 300 must poll the messaging system to get, for example, message deleted, message added.

Poll Event Mailbox: The messaging system queues events which the synchronizer 300 must poll to get but the events only tell which user mailbox changed, not what the specific changes were.

Callback Event: Similar to the Poll Event but the CMC interface uses a callback entry point into the synchronizer to report events instead of requiring the synchronizer to poll the messaging system.

Callback Event Mailbox: Similar to the Poll Event Mailbox but the CMC interface uses a callback entry point into the synchronizer to report events instead of requiring the synchronizer to poll the messaging system.

If there have been changes since the last sync cycle, synch/gateway thread 304 will set a flag in the user configuration structure on list 424 to indicate that the persistent version of the state database 306 must be updated. When scheduler 302 is signaled by synch/gateway thread 304 that it is finished processing a user, scheduler 302 will check this flag in the user configuration structure on list 424. If the aforementioned flag is set, scheduler 302 will send a message to a state database update thread to update the persistent version of the user's file in state database 306.

The synchronizer 300 also includes e-mail and voice-mail log threads (311 and 317, respectively) which are controlled by scheduler 302 somewhat differently. The logging subsystem 308 for a mail system is initialized during process startup and terminated during process shut down by scheduler 302. Logging subsystem 308 is also paused before a mail system server logs off and continued after a mail system server logs on. Server sessions may be created and terminated for each synchronization cycle or server sessions may be preserved unless scheduler 302 detects a configuration change, as previously discussed. Then, the session is terminated and a new server logon is initiated with the new configuration settings. When a log thread has been initialized and is not paused, it processes log messages kept in a log queue created for a particular mail system, such as log queues 310 and 315.

Synchronizer 300 is in one of six fundamental states including: Startup where the synchronizer program has just been started and initialization of the process context, including reading the administered configuration, is taking place. Synchronizer 300 interfaces with the mail systems through the CMC interfaces 204 and 216 (FIG. 2) supplied for each. During the startup state, scheduler 302 loads the CMC libraries for both mail systems. Scheduler 302 then initializes the CMC function pointer table in each mail system structure (414 and 416) with the addresses of the entry points for each CMC API function. Each CMC API function has been written using the appropriate calls in the e-mail API or the voice-mail API function set.

The next synchronizer state is Idle where the synchronizer is between synchronization intervals. Further states include Initial Sync where synchronizer 300 is performing its first synchronization cycle after startup and Sync where synch/gateway thread 304 and/or database update threads are executing. During this latter state, scheduler 302 sends commands and waits for replies from the synchronizer thread and the database update thread (not shown). This communication is managed by a pair of semaphores for scheduler-synchronizer thread communication and another pair of semaphores for scheduler-database update thread communication. A data structure is used for managing communication between threads and a separate data structure is allocated for each thread that the scheduler 302 controls. Each data structure contains the handles for the semaphores used and structure members for the commands and return codes passed between the scheduler and the threads. It also contains a data member used by the scheduler and the associated thread to signal that the scheduler has information for the thread or that the thread has information for the scheduler. For example, the scheduler 302 can first set the data in the data structure to command a synchronization and to indicate to the synchronizer thread which user needs to be synchronized and then can set the thread semaphore to signal the synchronizer thread to process the command. When the synchronizer thread is finished it sets the data to indicate the result of its processing other user's mailboxes and then sets the scheduler semaphore to single the scheduler 302 to process the results.

An intermediate state is Initial Shutdown which is entered if shutdown in requested before initialization is complete. In this state synchronizer 300 gracefully shuts down.

The final synchronizer state is Shutdown where synchronizer 300 is in the process of gracefully terminating the process.

Figure 5:
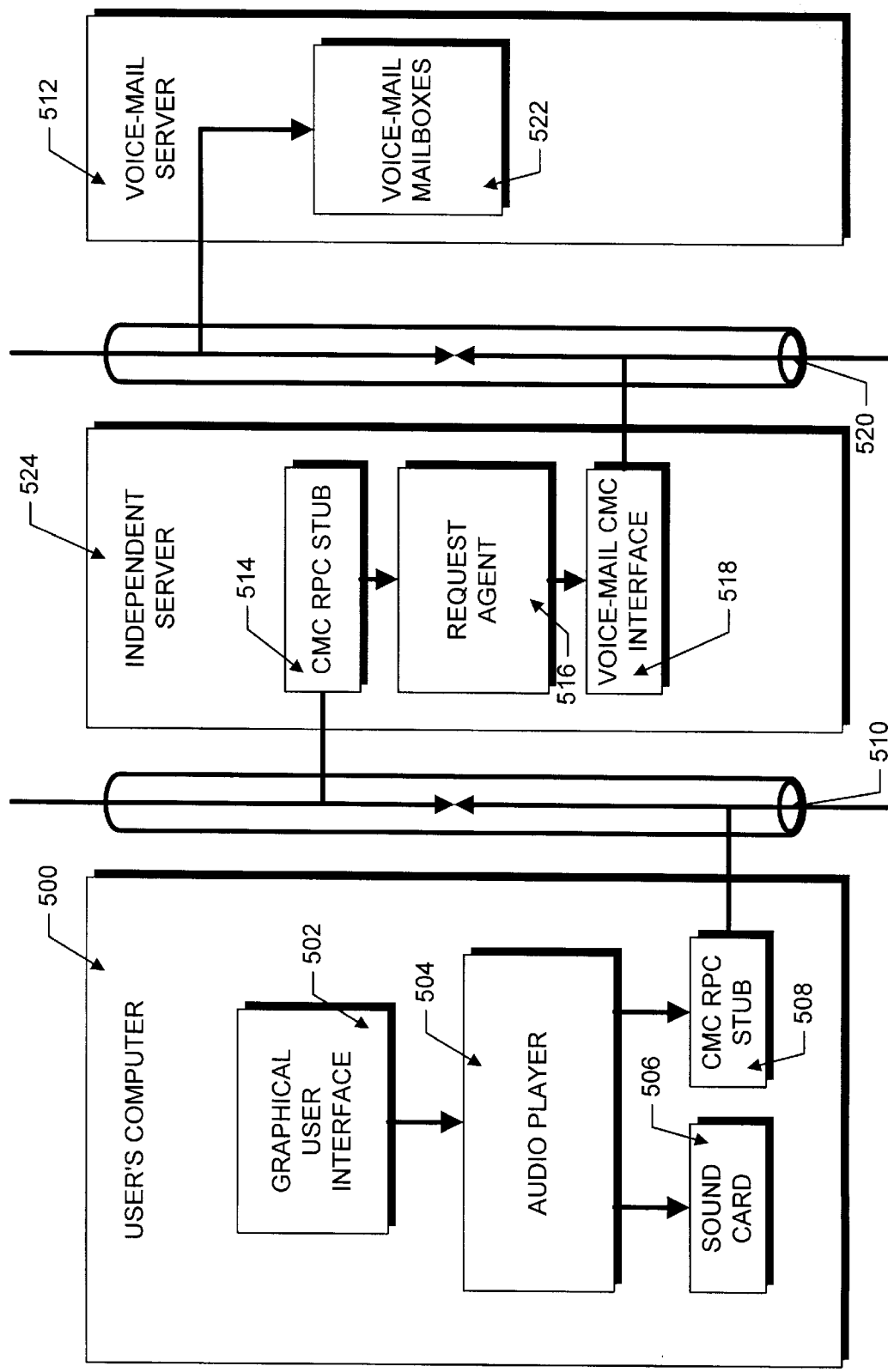
FIG. 5 is a block schematic diagram illustrating the audio player system in a user computer and the interaction of the audio player system with an optional request agent running in another server and used to access a voice-mail system.

Two other system components can also be used with the inventive messaging system. These include an audio player program and a request agent. Both of these components are illustrated in FIG. 5. The audio player 504 is an end user application which is invoked by the end user on a workstation 500 to handle a voice-mail attachment to an e-mail document. Audio player 504 comprises a conventional audio playback program which can be controlled by a graphical user interface 502 to reproduce a digitized audio file on a sound card 506 mounted in the user's workstation 500. When the digitized audio file is attached to an e-mail document, the e-mail system, which is also running on the user's workstation 500, can be used to retrieve the e-mail document and provide the digitized audio file attachment to audio player 504.

In other cases, the digitized audio file is not stored in the e-mail system, but is instead resident in the voice-mail system. In this latter case, the audio player 504 can access the voice-mail server 512 to retrieve the digitized audio file into the user's workstation 500 where the audio player 504 can reproduce it.

Request agent 516 is server application which provides audio player clients the ability to access voice mail services without being tied to a specific network transport. Request agent 516 runs in a standalone server 524 and accepts network messages from audio player 504 from a CMC interface. In particular, audio player 504 uses a CMC remote procedure call (RPC) stub 508 to generate CMC requests in a network protocol. These requests are transferred over a network 510 to a CMC RPC stub 514 located in the server 524 where the request agent 516 is running. Request agent 516 then "reconstructs" those messages and passes them on to the voice-mail server 512 via a voice-mail CMC interface 518 and another network schematically shown as network 520. Any resulting data or status information is then passed back to the audio player 504 via the network 520, the voice-mail CMC interface 518, the CMC RPC stub 514, the network 510 and the RPC stub 508. Using this arrangement, request agent 516 can accept requests from audio player 504 via any convenient transport protocol.

Request agent 516 has the following states: Initializing, Listening (waiting for Audio Player client requests), Client Session Management (when an Audio Player establishes a session) and Shutting down. The Request Agent uses both multiple threads and multiple processes. The RPCStart thread routine runs as a separate thread which initializes all network transports that are to be configured and then launches a listener thread for each. The RPCStart thread then waits for a request agent shutdown message and finally cleans up any resources utilized.

An RPCStartClientConnection routine runs as a separate thread. It gets called by a transport's network listener thread when an audio player client wishes to start a session. When the request agent 516 is running in multi-threaded mode, the RPCStartClientConnection thread manages an audio player session by taking any requests and translating them into the voice-mail CMC interface 518 functions.

When the request agent 516 is running in single-threaded mode, the RPCStartClientConnection thread creates a child request agent (CRA) for the session and then informs the audio player which started the session of the CRA's network connection so the audio player can reconnect to it. The RPCStartClientConnection thread then waits for the CRA to end and then performs any necessary cleanup.

The RPCProcessClientRequest routine takes an encoded network message from an audio player client, performs the necessary translations and then re-encodes a response which is then shipped back to the audio player.

Figure 6A:
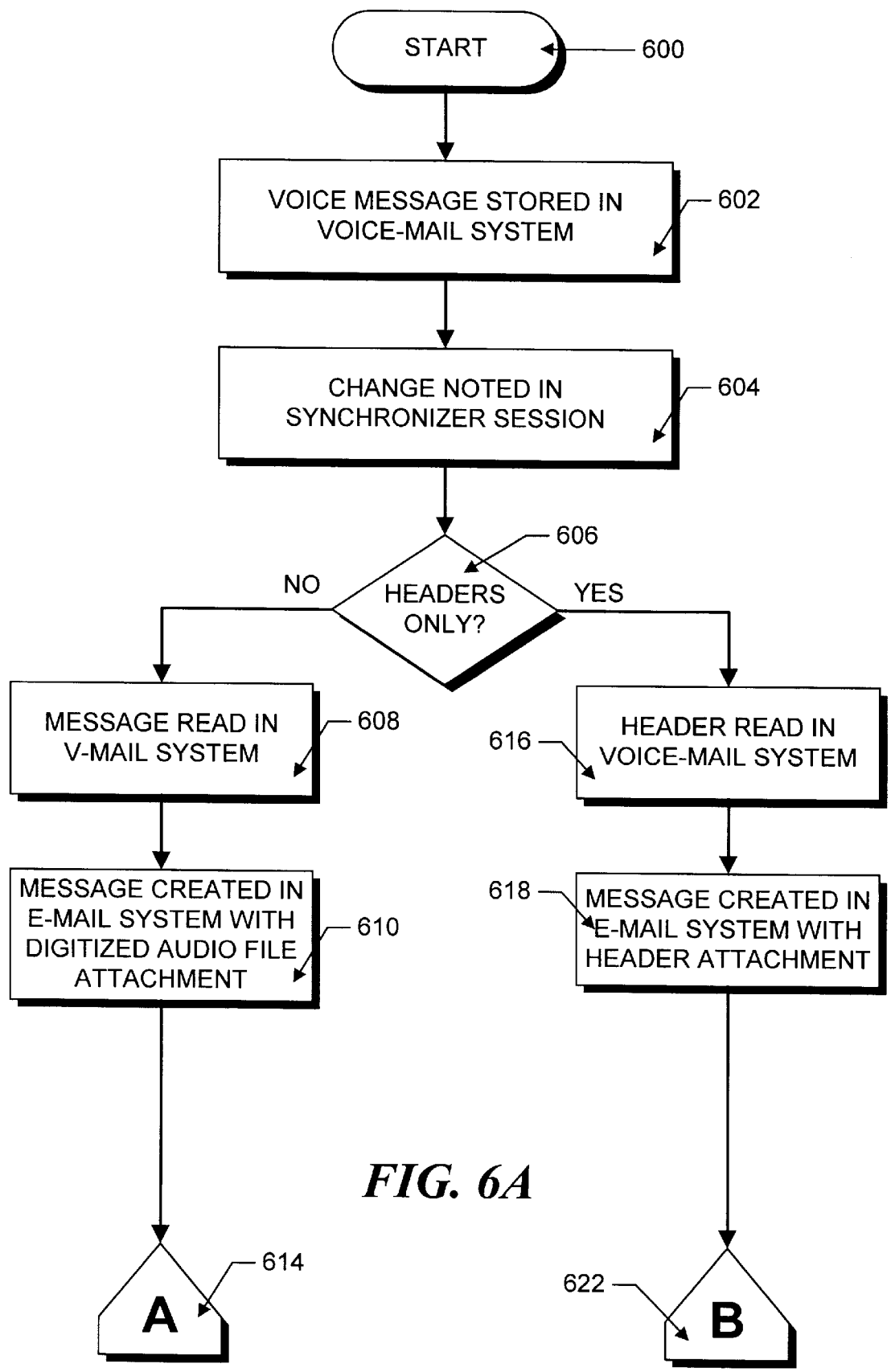
FIGS. 6A and 6B, when placed together, form a flowchart illustrating processing of a voice-mail message received in one messaging system.
Figure 6B:
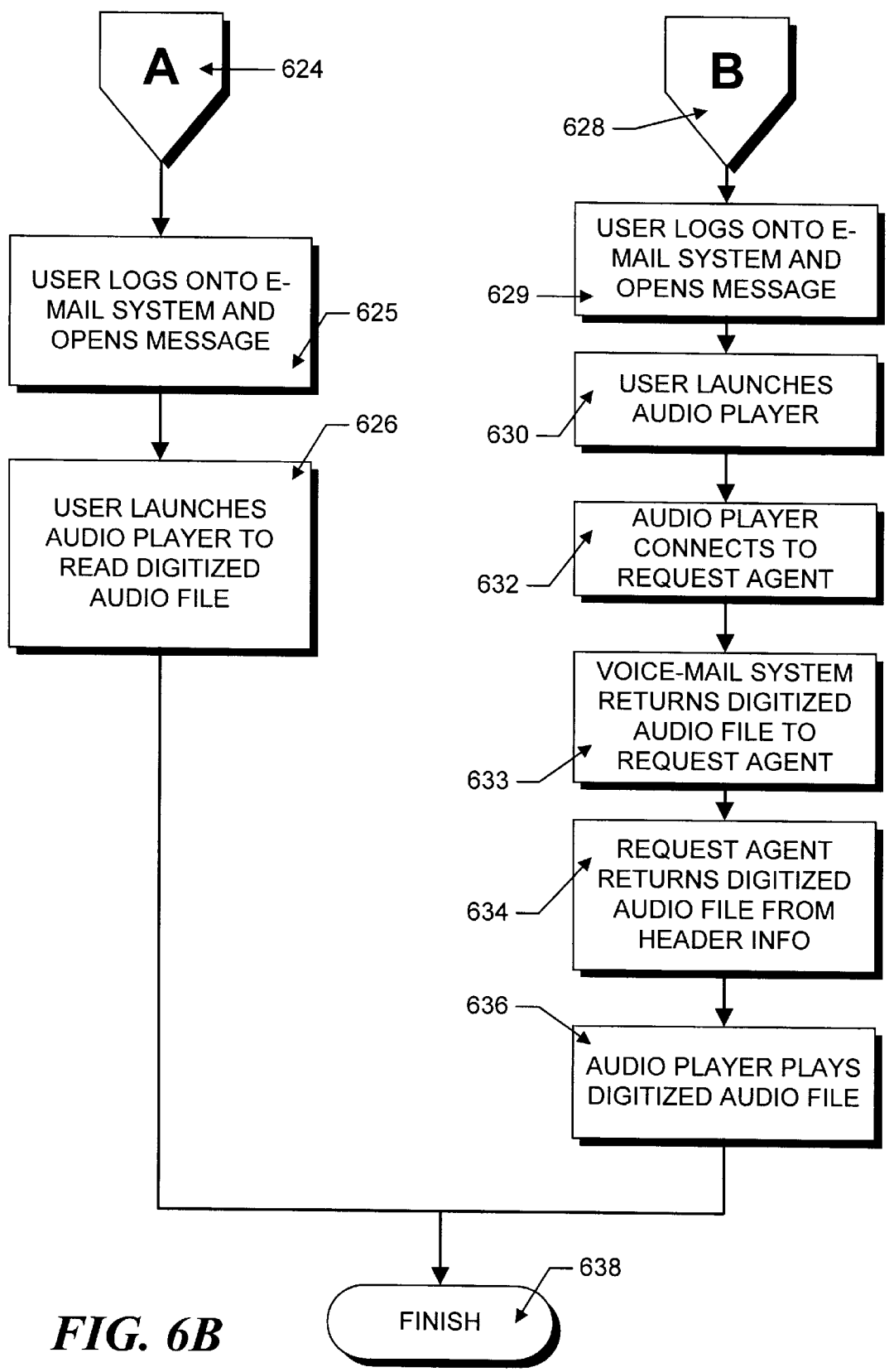

FIGS. 6A and 6B form a flowchart which illustrates processing by the inventive integrated messaging system when a voice message is received by the voice-mail system. As shown in FIG. 6A, the routine begins in step 600 and proceeds to step 602 where the incoming voice message is stored in the voice-mail system generally in the form of a digitized audio file.

In step 604 the change in the user's voice-mail mailbox is noted during processing of the user's e-mail and voice-mail mailboxes by a synch/gateway thread operating in the synchronization mode as previously described. At this point processing of the received voice-mail message is commenced. The routine proceeds to step 606 in which a decision is made whether the system is operating in a full copy mode or in a headers only mode. If a decision is made in step 606 that the messaging system is operating in full copy mode, the digitized voice-mail message is read from the voice-mail system by the synchronization thread in step 608 using the appropriate CMC commands. In step 610, the synchronization thread creates an e-mail message (not shown) in the user's mailbox containing the voice message as a digitized audio attachment.

The routine then proceeds, via off-page connectors 614 and 624 to step 625 (FIG. 6B) where the user logs onto the e-mail system and opens the message. In step 626, the user can then open the e-mail document with the digitized audio attachment by launching an audio player program in the user's computer to listen to the digitized audio message. The routine then finishes in step 638.

Alternatively, if in step 606, a decision is made that the system is operating in a headers only mode, in which only message headers, or other identification information, are stored on the e-mail system, the routine proceeds to step 616 in which the identification information is read from the voice-mail system, again using the CMC interface calls, as previously described.

In step 618, a message is created in the e-mail system with the information retrieved from the voice-mail system as an attachment.

The routine then proceeds, via off-page connectors 622 and 628, to step 630 where the user launches the audio player in his workstation in order to listen to the message. The audio player program in the user's computer either connects directly to a voice-mail server or connects to a request agent (step 632) and the request agent connects to the voice-mail system in order to retrieve the digitized voice file (step 634) so that the file can be played in the audio player as illustrated in step 636. The routine then finishes in step 638. Alternatively, after receiving the e-mail message, the user can listen to the voice-mail message via a telephone in the normal voice-mail system fashion (not shown.)

Figure 7:
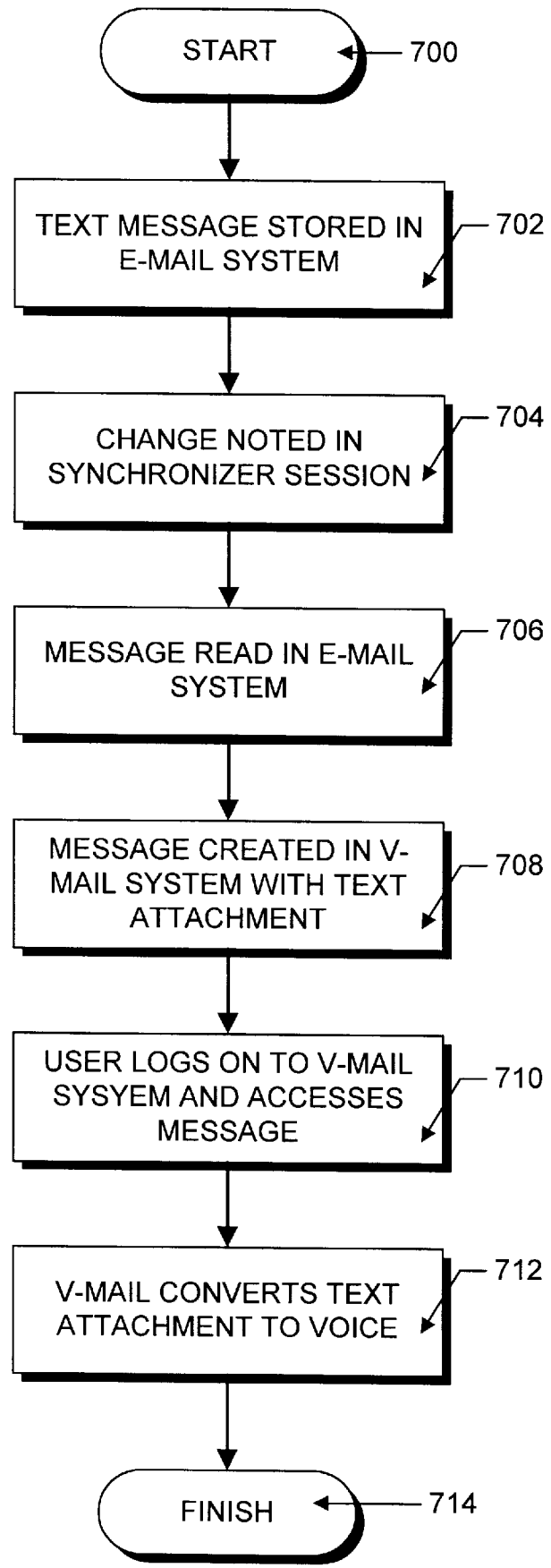
FIG. 7 is a flowchart illustrating processing of an e-mail message received in another messaging system.

FIG. 7 illustrates processing commenced by the inventive system after an e-mail message is received by the e-mail system. The illustrative routine starts in step 700 and proceeds to step 702 in which the received text e-mail message is stored in the e-mail system. This change is noted during a synchronization session for the user as noted in step 704. The synch/gateway thread then creates an voice-mail message in the user's voice-mail mailbox containing the e-mail text message as a text component as shown in steps 706 and 708. In voice-mail systems, binary attachments can often be added as a binary component to the voice message. Similarly, fax attachments can be added as a fax component to the voice message and digitized voice files can be added as a voice component to the voice message. The user may log on to the voice-mail system as indicated in step 710 and listen to the text or voice component of the e-mail via a telephone. The voice-mail system provides text-to-speech conversion for the text component as shown in step 712. The routine then finishes as illustrated in step 714.

While the invention has been shown and described above with respect to various preferred embodiments, it will be apparent that the foregoing and other changes of the form and detail may be made therein by one skilled in the art without departing from the spirit and scope of the invention. These and other obvious modifications are intended to be covered by the following claims.

What is claimed is:

1. Apparatus for use on a digital network for coordinating messages received in both a first messaging system which receives and stores messages in a first format and a second heterogeneous messaging system which receives and stores messages in a second format, the apparatus comprising:

a synchronizer connected to the network;

a first standard interface connecting the synchronizer to the first messaging system to allow the synchronizer to control the first messaging system;

a second standard interface connecting the synchronizer to the second messaging system to allow the synchronizer to control the second messaging system;

a first mechanism in the synchronizer for examining the second messaging system and for insuring that information is stored in the first messaging system corresponding to messages stored in second messaging system; and a second mechanism in the synchronizer cooperating with the first mechanism for deleting messages stored in the second messaging system corresponding to the information stored in the first messaging system.

2. Apparatus according to claim 1 wherein the digital network has a user computer connected thereto and the apparatus further comprises means for presenting on the user computer messages stored in the first messaging system in the first format.

3. Apparatus according to claim 2 wherein the apparatus further comprises means for presenting on the user computer messages stored in the first messaging system in the second format.

4. Apparatus according to claim 1 wherein the first mechanism stores information identifying messages stored in the second messaging system.

5. Apparatus according to claim 1 wherein the first mechanism comprises a synchronization mechanism which is responsive to messages received at the second messaging system for generating messages in the first format containing equivalent information and storing the generated first format messages in the first messaging system.

6. Apparatus according to claim 1 wherein the first mechanism comprises a synchronization mechanism which is responsive to messages received at the second messaging system for generating messages in the second format containing equivalent information and storing the generated second format messages in the first messaging system.

7. An integrated multimedia messaging system for use on a digital network, the system comprising:

a first message server comprising a storage and connected to the network for receiving messages in a first format and for digitizing first format messages and storing the digitized first format messages in the storage along with state information indicating whether the first format messages have been read and identification information uniquely identifying each first format message;

a second message server comprising a storage connected to the network for receiving messages in a second format different from the first format and for digitizing second format messages and storing the digitized second format messages in the storage along with state information indicating whether the second format messages have been read and identification information uniquely identifying each second format message;

a synchronizer connected to the network for insuring that message information is stored in the first server storage for both first format messages stored in the first server storage and second format messages stored in the second server storage; and a mechanism in the synchronizer which is responsive to second format message information being stored in the first server storage for accessing the second server using the message information stored in the first server to delete second format messages stored therein.

8. A system according to claim 7 further comprising a first workstation connected to the network including a message program for accessing the first server and retrieving messages stored therein and including a presentation mechanism for presenting both first format messages and second format messages to a user.

9. A system according to claim 7 further comprising a first workstation connected to the network including a message program for accessing the first server and retrieving messages stored therein, and further comprising a presenting mechanism for presenting first format messages and a conversion mechanism for converting second format messages to first format messages so that the first station can present second format messages.

10. A system according to claim 7 wherein the first server comprises a gateway mechanism which is responsive to second format messages received at the second server for generating first format messages containing equivalent information and storing the generated first format messages in the first server storage.

11. A method for use on a digital network for coordinating messages received in both a first messaging system which receives and stores messages in a first format and a second heterogeneous messaging system which receives and stores messages in a second format, the method comprising the steps of:

A. creating a synchronizer and connecting it to the network;

B. connecting the synchronizer to the first messaging system by means of a first standard interface to allow the synchronizer to control the first messaging system;

C. connecting the synchronizer to the second messaging system by means of a second standard interface to allow the synchronizer to control the second messaging system;

D. using a first mechanism in the synchronizer to examine the second messaging system and to insure that information is stored in the first messaging system corresponding to messages stored in second messaging system; and E. using a second mechanism in the synchronizer to examine the first messaging system and to delete messages stored in the second messaging system corresponding to the information stored in first messaging system.

12. A method according to claim 11 wherein step D comprises the step of:

D1. storing information identifying messages stored in the second messaging system.

13. A method according to claim 11 wherein step D comprises the step of:

D2. in response to messages received at the second messaging system, generating messages in the first format containing equivalent information and storing the generated first format messages in the first messaging system.

14. A method according to claim 11 wherein the digital network has a user computer connected thereto and the method further comprises the steps of:

F. presenting on the user computer messages stored in the first messaging system in the first format; and G. presenting on the user computer messages stored in the first messaging system in the second format.

15. A computer program product for use on a digital network for coordinating messages received in both a first messaging system which receives and stores messages in a first format and a second heterogeneous messaging system which receives and stores messages in a second format, the computer program product comprising a computer usable medium having computer readable program code thereon, the program code including:

program code for creating synchronizer connected to the network;

program code for creating a first standard interface connecting the synchronizer to the first messaging system to allow the synchronizer to control the first messaging system;

program code for creating a second standard interface connecting the synchronizer to the second messaging system to allow the synchronizer to control the second messaging system;

first program code in the synchronizer for examining the second messaging system and for insuring that information is stored in the first messaging system corresponding to messages stored in second messaging system; and second program code in the synchronizer for examining the first messaging system and for deleting messages in the second messaging system corresponding to messages stored in first messaging system.

16. A computer program product according to claim 15 wherein the digital network has a user computer connected thereto and the computer program product further comprises program code for presenting on the user computer messages stored in the first messaging system in the first format.

17. A computer program product according to claim 16 wherein the computer program product further comprises program code for presenting on the user computer messages stored in the first messaging system in the second format.

18. A computer program product according to claim 15 wherein the first program code in the synchronizer stores information identifying messages stored in the second messaging system.

19. A computer program product according to claim 15 wherein the first program code in the synchronizer comprises program code which is responsive to messages received at the second messaging system for generating messages in the first format containing equivalent information and storing the generated first format messages in the first messaging system.

20. A computer program product according to claim 15 wherein the second program code in the synchronizer comprises program code which is responsive to messages received at the second messaging system for generating messages in the second format containing equivalent information and storing the generated second format messages in the first messaging system.

* * * * *